United States Patent
Buras et al.

(10) Patent No.: US 7,495,045 B2
(45) Date of Patent: *Feb. 24, 2009

(54) USE OF INORGANIC ACIDS WITH CROSSLINKING AGENTS IN POLYMER MODIFIED ASPHALTS

(75) Inventors: Paul J. Buras, West University Place, TX (US); William Lee, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/834,219

(22) Filed: Aug. 6, 2007

(65) Prior Publication Data

US 2007/0275161 A1 Nov. 29, 2007

Related U.S. Application Data

(63) Continuation of application No. 10/972,022, filed on Oct. 22, 2004, now abandoned.

(51) Int. Cl.
*C08L 95/00* (2006.01)

(52) U.S. Cl. ........................................... 524/68
(58) Field of Classification Search ..................... 524/68
See application file for complete search history.

(56) References Cited

U.S. PATENT DOCUMENTS

| | | | |
|---|---|---|---|
| 3,120,486 A | 2/1964 | Braunwarth et al. | |
| 3,258,419 A | 6/1966 | Hanson | |
| 3,509,038 A | 4/1970 | Corbett | |
| 3,751,278 A | 8/1973 | Alexander | |
| 3,839,190 A | 10/1974 | Frese et al. | |
| 4,238,241 A | 12/1980 | Schneider | |
| 4,331,481 A | 5/1982 | Schneider | |
| 4,454,269 A | 6/1984 | Goodrich | |
| 4,711,672 A | 12/1987 | Gorter et al. | |
| 4,713,117 A | 12/1987 | Goodrich | |
| 4,741,868 A | 5/1988 | Rooney et al. | |
| 4,882,373 A | 11/1989 | Moran | |
| 5,017,230 A | 5/1991 | Hopkins et al. | |
| 5,059,300 A | 10/1991 | McGinnis | |
| 5,070,123 A | 12/1991 | Moran | |
| 5,095,055 A | 3/1992 | Moran | |
| 5,098,480 A | 3/1992 | McGinnis et al. | |
| 5,225,462 A | 7/1993 | Mancini | |
| 5,228,977 A | 7/1993 | Moran et al. | |
| 5,284,509 A | 2/1994 | Kamel et al. | |
| 5,348,994 A | 9/1994 | Gorbaty et al. | |
| 5,549,744 A | 8/1996 | Puzic et al. | |
| 5,565,510 A | 10/1996 | Giavarini et al. | |
| 5,618,862 A * | 4/1997 | Germanaud et al. | 524/68 |
| 5,637,141 A | 6/1997 | Puzic et al. | |
| 5,880,185 A * | 3/1999 | Planche et al. | 524/68 |
| 5,990,206 A * | 11/1999 | Tanaka et al. | 524/59 |
| 6,031,029 A | 2/2000 | Baumgardner et al. | |
| 6,074,469 A | 6/2000 | Collins et al. | |
| 6,117,926 A | 9/2000 | Engber et al. | |
| 6,136,898 A * | 10/2000 | Loza et al. | 524/69 |
| 6,228,909 B1 | 5/2001 | Baumgardner et al. | |
| 6,399,680 B1 | 6/2002 | Engber et al. | |
| 6,414,056 B1 | 7/2002 | Puzic et al. | |
| 6,444,731 B1 | 9/2002 | Memon | |
| 6,451,886 B1 | 9/2002 | Krivohlavek et al. | |
| 2006/0081152 A1 * | 4/2006 | Buras et al. | 106/273.1 |

FOREIGN PATENT DOCUMENTS

| | | |
|---|---|---|
| DE | 1 180 083 | 10/1964 |
| DE | 2 255 173 | 5/1974 |
| EP | 0 710 700 B1 | 3/1999 |
| GB | 1 534 183 | 11/1978 |

OTHER PUBLICATIONS

Superpave Series No. 1 (SP-1), 1997 printing, pp. ii-67, published by Asphalt Institute (Research Park Drive, P.O. Box 14052, Lexington, KY 40512-4052).

* cited by examiner

*Primary Examiner*—Peter Szekely
(74) *Attorney, Agent, or Firm*—Tenley R. Krueger

(57) ABSTRACT

Asphalt and polymer mixtures treated with an inorganic acid and cross-linked with sulfur and/or other crosslinkers or accelerators gives a polymer modified asphalt with improved high temperature properties. The acid should be added to the asphalt before the crosslinker.

35 Claims, No Drawings

USE OF INORGANIC ACIDS WITH CROSSLINKING AGENTS IN POLYMER MODIFIED ASPHALTS

RELATED APPLICATIONS

This is a continuation application of U.S. patent application Ser. No. 10/972,022, which was filed on Oct. 22, 2004 and now abandoned. This continuation application was filed while the 10/972,022 application was still pending, and this application claims priority to the foregoing application.

FIELD OF THE INVENTION

The present invention is related in one non-limiting embodiment to hydrocarbon-based binders, such as bitumens, asphalts and tars, modified with elastomers, and including a vulcanized stage, which are particularly useful as industrial coatings and road bitumens, or the like. It relates more particularly in another non-restrictive embodiment to processes for obtaining vulcanized compositions based on bitumens and on styrene/butadiene copolymers that have acid incorporated therein to improve the properties of the resulting polymer modified asphalts.

BACKGROUND OF THE INVENTION

The use of bitumen (asphalt) compositions in preparing aggregate compositions (including, but not just limited to, bitumen and rock) useful as road paving material is complicated by at least three factors, each of which imposes a serious challenge to providing an acceptable product. First, the bitumen compositions must meet certain performance criteria or specifications in order to be considered useful for road paving. For example, to ensure acceptable performance, state and federal agencies issue specifications for various bitumen applications including specifications for use as road pavement. Current Federal Highway Administration specifications require a bitumen (asphalt) product to meet defined parameters relating to properties such as viscosity, stiffness, penetration, toughness, tenacity and ductility. Each of these parameters define a critical feature of the bitumen composition, and compositions failing to meet one or more of these parameters will render that composition unacceptable for use as road pavement material.

Conventional bitumen compositions frequently cannot meet all of the requirements of a particular specification simultaneously and, if these specifications are not met, damage to the resulting road can occur, including, but not necessarily limited to, permanent deformation, thermally induced cracking and flexural fatigue. This damage greatly reduces the effective life of paved roads.

In this regard, it has long been recognized that the properties of conventional bitumen compositions can be modified by the addition of other substances, such as polymers. A wide variety of polymers have been used as additives in bitumen compositions. For example, copolymers derived from styrene and conjugated dienes, such as butadiene or isoprene, are particularly useful, since these copolymers have good solubility in bitumen compositions and the resulting modified-bitumen compositions have good rheological properties.

It is also known that the stability of polymer-bitumen compositions can be increased by the addition of crosslinking agents (vulcanizing agents) such as sulfur, frequently in the form of elemental sulfur. It is believed that the sulfur chemically couples the polymer and the bitumen through sulfide and/or polysulfide bonds. The addition of extraneous sulfur may be helpful to produce improved stability, even though bitumens naturally contain varying amounts of native sulfur.

Thus, there are known processes for preparing a bitumen-polymer composition consisting of mixing a bitumen, at temperatures of about 266-446° F. (130-230° C.), with 2 to 20% by weight of a block or random copolymer, having an average molecular weight between 30,000 and 300,000. The resulting mixture is stirred for at least two hours, and then 0.1 to 3% by weight of sulfur relative to the bitumen is added and the mixture agitated for at least 20 minutes. The quantity of added sulfur can be from about 0.1 to 1.5% by weight with respect to the bitumen. The resulting bitumen-polymer composition is used for road-coating, industrial coating, or other industrial applications.

Similarly, there are also known asphalt (bitumen) polymer compositions obtained by hot-blending asphalt with from about 0.1 to 1.5% by weight of elemental sulfur and 1 to 7% by weight of a natural or synthetic rubber, which can be a linear butadiene/styrene copolymer. A process is additionally known for preparing a rubber-modified bitumen by blending rubber, either natural or synthetic, such as styrene/butadiene rubber, with bitumen at 280-400° F. (138-204° C.), in an amount up to 10% by weight based on the bitumen, then adjusting the temperature to 257-320° F. (125-160° C.), and intimately blending into the mix an amount of sulfur such that the weight ratio of sulfur to rubber is between 0.01 and 0.9. A catalytic quantity of a vulcanization-accelerator is also added to effect vulcanization. A critical nature of the sulfur to rubber ratio is sometimes reported, for instance that weight ratios of sulfur to rubber of less than 0.01 gives modified bitumen of inferior quality.

A second factor complicating the use of bitumen compositions concerns the viscosity stability of such compositions under storage conditions. In this regard, bitumen compositions are frequently stored for up to 7 days or more before being used and, in some cases, the viscosity of the composition can increase so much that the bitumen composition is unusable for its intended purpose. On the other hand, a storage stable bitumen composition would provide for only minimal viscosity increases and, accordingly, after storage it can still be employed for its intended purpose.

Asphaltic concrete, typically including asphalt and aggregate, asphalt compositions for resurfacing asphaltic concrete, and similar asphalt compositions must exhibit a certain number of specific mechanical properties to enable their use in various fields of application, especially when the asphalts are used as binders for superficial coats (road surfacing), as asphalt emulsions, or in industrial applications. (The term "asphalt" is used herein interchangeably with "bitumen." Asphaltic concrete is asphalt used as a binder with appropriate aggregate added, typically for use in roadways.) The use of asphalt or asphalt emulsion binders either in maintenance facings as a surface coat or as a very thin bituminous mix, or as a thicker structural layer of bituminous mix in asphaltic concrete, is enhanced if these binders possess the requisite properties such as desirable levels of elasticity and plasticity.

As noted, various polymers have been added to asphalts to improve physical and mechanical performance properties. Polymer-modified asphalts (PMAs) are routinely used in the road construction/maintenance and roofing industries. Conventional asphalts often do not retain sufficient elasticity in use and, also, exhibit a plasticity range that is too narrow for use in many modern applications such as road construction. It is known that the characteristics of road asphalts and the like can be greatly improved by incorporating into them an elastomeric-type polymer which may be one such as butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of styrene and a conjugated diene. The modified asphalts thus obtained commonly are referred to variously as bitumen/polymer binders or asphalt/polymer mixes. Modified asphalts and asphalt emulsions typically are produced utilizing styrene/butadiene based polymers, and typically have raised softening point, increased viscoelasticity, enhanced force under strain, enhanced strain recovery, and improved low temperature strain characteristics as compared with non-modified asphalts and asphalt emulsions.

The bituminous binders, even of the bitumen/polymer type, which are presently employed in road applications often do not have the optimum characteristics at low enough polymer concentrations to consistently meet the increasing structural and workability requirements imposed on roadway structures and their construction. In order to achieve a given level of modified asphalt performance, various polymers are added at some prescribed concentration.

Current practice is to add the desired level of a single polymer, sometimes along with a reactant that promotes cross-linking of the polymer molecules until the desired asphalt properties are met. This reactant typically is sulfur in a form suitable for reacting.

However, the cost of the polymer adds significantly to the overall cost of the resulting asphalt/polymer mix. Thus, cost factors weigh in the ability to meet the above criteria for various asphalt mixes. In addition, at increasing levels of polymer concentration, the working viscosity of the asphalt mix becomes excessively great and separation of the asphalt and polymer may occur.

It is common in the preparation of polymer-modified asphalts to include activators and accelerators to make the crosslinking reaction proceed faster. Zinc oxide (ZnO) is a conventional activator, and mercaptobenzothiazole (MBT) is a conventional accelerator. ZnO is also sometimes used to control the tendency of the polymer to gel. The zinc salt of mercaptobenzothiazole (ZMBT) combines features of both of these conventional additives.

As can be seen from the above, methods are known to improve the mixing of asphalt and polymer compositions. The needed elements for the commercial success of any such process include keeping the process as simple as possible, reducing the cost of the ingredients, and utilizing available asphalt cuts from a refinery without having to blend in more valuable fractions. In addition, the resulting asphalt composition must meet the above-mentioned governmental physical properties and environmental concerns. Thus, it is a goal of the industry to maintain or reduce the cost of the polymers and crosslinking agents added to the asphalt without sacrificing any of the other elements and improving the properties of the asphalt and polymer compositions as much as possible.

SUMMARY OF THE INVENTION

There is provided, in one non-restrictive form, a method for preparing asphalt and polymer compositions that involves heating an asphalt, adding an elastomeric polymer and an inorganic acid to the asphalt in any order to form a mixture, where the proportion of inorganic acid ranges from about 0.05 to about 2 wt % based on the total mixture. A crosslinker is added to the mixture after the addition of the acid. The crosslinker may be added before or after the polymer. The mixture is then cured to give a polymer modified asphalt (PMA). In one non-limiting embodiment, the PMA has an improved high temperature property as compared with an identical PMA absent the inorganic acid, where the property is ODSR and/or RTFO fail temperatures. In one non-restrictive embodiment, the PMA is produced in commercial scale quantities, which may include a quantity sufficient to surface a roof or a quantity sufficient to surface a road, and the like.

In another non-restrictive embodiment, there are provided polymer modified asphalt (PMA) compositions prepared by heating an asphalt and adding an elastomeric polymer and an inorganic acid to the asphalt in any order to form a mixture. The proportion of inorganic acid ranges from about 0.05 to about 2 wt % based on the total mixture. A crosslinker is added to the mixture after the addition of the acid. The mixture is cured to give a polymer modified asphalt (PMA). The innovations herein include roads made from these PMAs as well as methods of building such roads, and roofs sealed with these PMAs along with methods for sealing roofs with these PMAs. Recycled asphalts incorporating the PMAs herein may be used, and aggregates coated with the PMAs herein are also contemplated.

DETAILED DESCRIPTION OF THE INVENTION

It has been discovered that improvements in rubber/asphalt compatibility may be obtained by treating an asphalt with acid prior to the addition of a crosslinker, where the polymer may be added at any time. While acid treatments of asphalts are known, it is unknown that the sequence of addition makes a difference in the properties or quality of the asphalt produced. Adding the acid to the asphalt prior to the crosslinker, or a substantially effective amount of crosslinker, gives a polymer modified asphalt with improved high temperature properties. These improved properties include, but are not necessarily limited to, ODSR fail temperature (original DSR) and RTFO fail temperature. By a "substantially effective amount of crosslinker" is meant enough to crosslink to a measurable extent.

As used herein, the term "bitumen" (sometimes referred to as "asphalt") refers to all types of bitumens, including those that occur in nature and those obtained in petroleum processing. The choice of bitumen will depend essentially on the particular application intended for the resulting bitumen composition. Bitumens that can be used can have an initial viscosity at 140° F. (60° C.) of 600 to 3000 poise (60 to 300 Pa-s) depending on the grade of asphalt desired. The initial penetration range (ASTM D5) of the base bitumen at 77° F. (25° C.) is 20 to 320 dmm, and can be 50 to 150 dmm, when the intended use of the copolymer-bitumen composition is road paving. Bitumens that do not contain any copolymer, sulfur, etc., are sometimes referred to herein as a "base bitumen."

"Elastomeric Polymers" are natural or synthetic rubbers and include, but are not necessarily limited to, butyl, polybutadiene, polyisoprene or polyisobutene rubber, ethylene/vinyl acetate copolymer, polyacrylate, polymethacrylate, polychloroprene, polynorbornene, ethylene/propylene/diene (EPDM) terpolymer and advantageously a random or block copolymer of a vinyl aromatic compound, e.g. styrene, and conjugated dienes. In one non-limiting embodiment, styrene/conjugated diene block copolymers may be used that are linear, radial, or multibranched. Styrene/butadiene and styrene/isoprene copolymers having an average molecular weight of between 30,000 and 300,000 have been found to be particularly useful.

"Conjugated dienes" refer to alkene compounds having 2 or more sites of unsaturation wherein a second site of unsaturation is conjugated to a first site of unsaturation, i.e., the first carbon atom of the second site of unsaturation is gamma (at carbon atom 3) relative to the first carbon atom of the first site of unsaturation. Conjugated dienes include, by way of non-limiting example, butadiene, isoprene, 1,3-pentadiene, and the like.

"Block copolymers of styrene and conjugated-dienes" refer to copolymers of styrene and conjugated-dienes having a linear or radial, tri-block structure consisting of styrene-conjugated diene-styrene block units that are copolymers are represented by the formula:

$$S_x\text{-}D_y\text{-}S_z$$

where D is a conjugated-diene, S is styrene, and x, y and z are integers such that the number average molecular weight of the copolymer is from about 30,000 to about 300,000. These copolymers are well known to those skilled in the art and are either commercially available or can be prepared from methods known in the art. Such tri-block copolymers may be derived from styrene and a conjugated-diene, wherein the conjugated-diene is butadiene or isoprene. Such copolymers may contain 15 to 50 percent by weight copolymer units derived from styrene, alternatively may contain 20 to 35 percent derived from styrene, and then again may contain 28 to 31 percent derived from styrene, the remainder being derived from the conjugated diene. These copolymers may have a number average molecular weight range between about 50,000 and about 200,000, and alternatively have a number average molecular weight range between about 80,000 and about 180,000. The copolymer can employ a minimal amount of hydrocarbon oil in order to facilitate handling. Examples of suitable solvents include plasticizer solvent that is a non-volatile aromatic oil. However, when the hydrocarbon oil is a volatile solvent (as defined above), care should be taken to ensure that the amount of solvent contained in the final bitumen composition is less than about 3.5 weight percent.

In one non-limiting embodiment, the elastomeric polymer is present in a proportion of from about 1 to about 20 wt % of the asphalt/polymer mixture. In another, non-restrictive form, the polymer is present in an amount of from about 1 to about 6 wt % of the mixture.

The term "sulfur" is defined herein as elemental sulfur in any of its physical forms, whereas the term "sulfur-containing derivative" includes any sulfur-donating compound, but not elemental sulfur. Sulfur-donating compounds are well known in the art and include various organic compositions or compounds that generate sulfur under the mixing or preparation conditions. In one non-limiting embodiment, the elemental sulfur is in powder form known as flowers of sulfur. Other sulfur-containing derivatives or species that can be used herein include, but are not necessarily limited to mercapto-benzothiazole, thiurams, dithiocarbamates, sulfur-containing oxazoles, thiazole derivatives, and the like, and combinations thereof. "Thiazole derivatives" include, but are not necessarily limited to, compounds having the necessary functional group to serve as sulfur donors, such as —N═C(R)—S—, including oxazoles. In another non-limiting embodiment, the sulfur and/or other crosslinker is present in an amount ranging from about 0.01 to about 0.75 wt %, alternatively from about 0.06% to about 0.3 wt. % based on the asphalt, and in another non-limiting embodiment is present in an amount from about 0.08 to about 0.2 wt. %. As noted earlier, the zinc salt of mercaptobenzothiazole (ZMBT) combines features of conventional additives. Other metal salts of MBT may also be useful.

Acceptable crosslinkers, in one non-limiting embodiment, are thiuram polysulfides. In another non-limiting embodiment, the thiuram polysulfides have the formula:

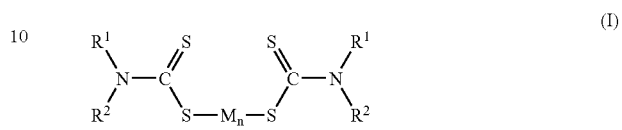

where $R^1$ and $R^2$ are the same or different alkyl substituents having from 1 to 4 carbon atoms, and wherein M is a metal selected from zinc, barium or copper, and n is 0 or 1. In another non-limiting embodiment, a crosslinking temperature range for thiuram polysulfides of formula (I) is above 180° C. (356° F.), alternatively, the crosslinking temperature range may be between about 130 and about 205° C. (280-400° F.). Thiuram polysulfides herein include, but are not limited to, zinc dialkyldithiocarbamates such as dimethyldithiocarbamate.

The term "desired Rheological Properties" refers primarily to the SUPERPAVE asphalt binder specification designated by AASHTO as MP1 as will be described below. Additional asphalt specifications can include viscosity at 140° F. (60° C.) of from 1600 to 4000 poise (160-400 Pa-s) before aging; a toughness of at least 110 inch-pound (127 cm-kilograms) before aging; a tenacity of at least 75 inch-pound (86.6 cm-kilograms) before aging; and a ductility of at least 25 cm at 39.2° F. (4° C.) at 5 cm/min. pull rate after aging.

Viscosity measurements are made by using ASTM test method D2171. Ductility measurements are made by using ASTM test method D113. Toughness and tenacity measurements are made by a Benson Method of Toughness and Tenacity, run at 20 inches/minute (50.8 cm/minute) pull rate with a ⅛ inch (2.22 cm) diameter ball.

By "storage stable viscosity" it is meant that the bitumen composition shows no evidence of skinning, settlement, gelation, or graininess and that the viscosity of the composition does not increase by a factor of four or more during storage at 325±0.5° F. (163±2.8° C.) for seven days. In one non-restrictive version, the viscosity does not increase by a factor of two or more during storage at 325° F. (163° C.) for seven days. In another non-limiting embodiment, the viscosity increases less than 50% during seven days of storage at 325° F. (163° C.). A substantial increase in the viscosity of the bitumen composition during storage is not desirable due to the resulting difficulties in handling the composition and in meeting product specifications at the time of sale and use.

The term "aggregate" refers to rock and similar material added to the bitumen composition to provide an aggregate composition suitable for paving roads. Typically, the aggregate employed is rock indigenous to the area where the bitumen composition is produced. Suitable aggregate includes granite, basalt, limestone, and the like.

As used herein, the term "asphalt cement" refers to any of a variety of substantially solid or semi-solid materials at room temperature that gradually liquify when heated. Its predominant constituents are bitumens, which may be naturally occurring or obtained as the residue of refining processing. As mentioned, the asphalt cements are generally characterized by a penetration (PEN, measured in tenths of a millimeter, dmm) of less than 400 at 25° C., and a typical penetration range between 40 and 300 (ASTM Standard, Method D-5). The viscosity of asphalt cement at 60° C. is more than about 65 poise. Asphalt cements are alternately defined in terms specified by the American Association of State Highway Transportation Officials (AASHTO) AR viscosity system.

The asphalt terms used herein are well known to those skilled in the art. For an explanation of these terms, reference is made to the booklet SUPERPAVE Series No. 1 (SP-1), 1997 printing, published by the Asphalt Institute (Research Park Drive, P.O. Box 14052, Lexington, Ky. 40512-4052), which is hereinafter referred to as MP1 (Standard Specification for Performance Graded Asphalt Binder). For example, Chapter 2 provides an explanation of the test equipment, terms, and purposes. Rolling Thin Film Oven (RTFO) and Pressure Aging Vessel (PAV) are used to simulate binder aging (hardening) characteristics. Dynamic Shear Rheometers (DSR) are used to measure binder properties at high and intermediate temperatures. These are used to predict permanent deformation or rutting and fatigue cracking. Bending Beam Rheometers (BBRs) are used to measure binder properties at low temperatures. These values predict thermal or low temperature cracking. The procedures for these experiments are also described in the above-referenced SUPERPAVE booklet.

Asphalt grading is given in accordance with accepted standards in the industry as discussed in the above-referenced Asphalt Institute booklet. For example, pages 62-65 of the booklet include a table entitled Performance Graded Asphalt Binder Specifications. The asphalt compositions are given performance grades, for example, PG 64-22. The first number, 64, represents the average 7-day maximum pavement design temperature in ° C. The second number, -22, represents the minimum pavement design temperature in ° C. Other requirements of each grade are shown in the table. For example, the maximum value for the PAV-DSR test (° C.) for PG 64-22 is 25° C.

One of the methods commonly utilized in the industry to standardize the measure or degree of compatibility of the rubber with the asphalt is referred to as the compatibility test. Compatibility tests provide a measure of the degree of separability of materials comprising the asphalt. The long-term compatibility between rubber and the other components of PMA, for example, is an important consideration when preparing road material. If rubber is not compatible with the other components of PMA, then the performance of road materials containing PMA is degraded. Compatibility is assessed by measuring the softening point of asphalt after a period of thermally-induced aging (for example Louisiana DOTD Asphalt Separation of Polymer Test Method TR 326). The test is performed on a polymer-modified asphalt mixture comprised of rubber and asphalt with all the applicable additives, such as the crosslinking agents. The mixture is placed in tubes, usually made of aluminum or similar material, referred to as cigar tubes or toothpaste tubes. These tubes are about one inch (2.54 cm) in diameter and about fifteen centimeters deep. The mixture is placed in an oven heated to a temperature of about 162° C. (320° F.). This temperature is representative of the most commonly used asphalt storage temperature. After the required period of time, most commonly twenty-four (24) hours, the tubes are transferred from the oven to a freezer and cooled down to solidify. The tubes are kept in the vertical position. After cooling down, the tubes are cut into thirds; three equal sections. The Ring and Ball softening point of the top one third is compared to the softening point of the bottom section. This test gives an indication of the separation or compatibility of the rubber within the asphalt. The rubber would have the tendency to separate to the top. The lower the difference in softening point between the top and bottom sections, the more compatible are the rubber and asphalt. In today's environment, many states require a difference of 4° F. (2° C.) or less to consider the asphalt/rubber composition as compatible. Few standards allow a higher difference. The twenty-four hour test is used as a common comparison point. In one non-limiting embodiment, this compatibility test value is 20° C. or less.

In accordance with one non-restrictive embodiment, an asphalt composition is prepared by adding the asphalt or bitumen to a mixing tank that has stirring means. The asphalt is added and stirred at elevated temperatures. Stirring temperatures depend on the viscosity of the asphalt and can range up to 500° F. (260° C.). Asphalt products from refinery operations are well known in the art. For example, asphalts typically used for this process are obtained from deep vacuum distillation of crude oil to obtain a bottom product of the desired viscosity or from a solvent deasphalting process that yields a demetallized oil, a resin fraction and an asphaltene fraction. Some refinery units do not have a resin fraction. These materials or other compatible oils of greater than 450° F. (232° C.) flash point may be blended to obtain the desired viscosity asphalt.

Rubbers, elastomeric polymers, or thermoplastic elastomers suitable for this application are well known in the art as described above. For example, FINA-PRENE® SBS rubber products available from Atofina Elastomers Inc. are suitable for the applications herein. This example is not limiting for the inventive technology that can be applied to any similar elastomeric product particularly those produced from styrene and butadiene.

It has been found that the addition of inorganic acids to the asphalts improves the properties thereof, and it has been surprisingly discovered that the addition of the acid prior to the crosslinker particularly gives better results. It is not known by what mechanism this phenomenon occurs, such as whether by oxidizing or crosslinking, and the invention is not limited to any particular mechanism or explanation, although the asphalt seems to be hardened by this method.

Suitable inorganic acids for use in the methods herein include, but are not necessarily limited to, phosphoric acid, polyphosphoric acid, sulfuric acid, hydrochloric acid, nitric acid, and mixtures thereof. Herein, phosphoric acid includes polyphosphoric acid. In one non-limiting embodiment, the proportion of inorganic acid ranges from about 0.05 to about 2 wt % based on the total mixture of asphalt, acid and polymer. In another non-restrictive embodiment, the proportion of inorganic acid ranges from about 0.05 to about 1 wt % based on the total mixture.

In another non-restrictive embodiment, a metal oxide activator is also present in the asphalt/polymer mixture herein. As mentioned, zinc oxide is a known, conventional activator, and can also be used to suppress the evolution of hydrogen sulfide. Other useful metal oxides include, but are not necessarily limited to, CaO, MgO and CuO as discussed in U.S. Patent Application 2004/0030008 A1, incorporated by reference herein. In one non-restrictive form, the acid is present in an equimolar amount of the ZnO present.

Various other additives suitable for the purposes herein include, but are not necessarily limited to, known and future accelerators, activators, divalent metal oxides (e.g. zinc oxide) and the like. A variety of accelerators may be used in conjunction herein, including, but not limited to, dithiocarbamates and benzothiazoles. Many crosslinking agents and other additives are normally sold in powder or flake form.

The methods and compositions described will be further illustrated with respect to particular Examples that are only intended to more fully illuminate the compositions and methods and not limit them.

EXAMPLES 1-6

Phosphoric acid in low concentrations improved the high-temperature MP1 properties of neat and polymer modified asphalt. Concentrations of acid from 0.1 to 0.3 wt % improved the ODSR Fail Temperature of neat asphalt by 2 to 2.5° C. The RTFO DSR Fail Temperature of neat asphalt was improved by approximately 4° C. at 0.1 to 0.3 wt % acid. The limiting RTFO DSR Fail Temperature of PMA with 0.1 to 0.3 wt % phosphoric acid was raised 3 to 4° C. Low temperature properties were not significantly affected.

The materials used in Examples 1-6 included a base asphalt, FINAPRENE 502 SBS polymer (FP502), ZnO, MBT, sulfur, and phosphoric acid. The experimental formulation and initial procedures are given in Table I.

TABLE I

Formulations of Examples 1-6

| Example | Formulation and Initial Procedure |
|---|---|
| 1 | Grade the base asphalt according to MP1. |
| 2 | Formulate a blend composed of 99.9 wt % base asphalt and 0.1 wt % phosphoric acid; MP1 grade. |
| 3 | Formulate a blend composed of 99.7 wt % base asphalt and 0.3 wt % phosphoric acid; MP1 grade. |
| 4 | Formulate a PMA (Control) blend composed of 96 wt % base asphalt and 4 wt % FP502; crosslink with 0.06 wt % ZnO/0.06 wt % MBT/0.12 wt % S. Test for compatibility, MP1 grade, and measure the 135° C. Viscosity. |
| 5 | Formulate a PMA blend composed of 96 wt % base asphalt, 4 wt % FP502, and 0.1 wt % phosphoric acid; crosslink with 0.6 ZnO/0.06 MBT/0.12 S. Test for Compatibility, MP1 Grade, and measure the 135° C. Viscosity. |
| 6 | Formulate a PMA blend composed of 96 wt % base asphalt, 4 wt % FP502, and 0.3 wt % phosphoric acid; crosslink with 0.6 ZnO/0.06 MBT/0.12 S. Test for Compatibility, MP1 Grade, and measure the 135° C. Viscosity. |

Procedure

The asphalt sample was heated to 350° F. (177° C.) with low shear mixing. The designated acid was added and stirring the sample continued for 10 minutes. PMA formulations were mixed according to the following procedure, after acid addition (where applicable):

The asphalt sample was heated to 350° F. (177° C.) with low shear mixing. The mixing was changed to high shear and the polymer added. Mixing continued on high shear for 1 hour at 350° F. (177° C.). The mixing was reduced to low shear. The crosslinking agents were added and mixing continued on low shear at 350° F. (177° C.) for 1 hour. The PMA mixture was aged in the oven at 325° F. (163° C.) for 24 hours. The cured asphalt was tested for 24/48-hour Compatibility, MP1 grade, and the 135° C. Rotational Viscosity measured. Observations were noted (e.g. gelling, film formation, lumps, smoke, etc.).

Test results for the blends of neat asphalt modified with phosphoric acid are presented in Table II.

TABLE II

Base Asphalt Modified with Phosphoric Acid

| | | Examples | | |
|---|---|---|---|---|
| | Units | 1 (Control) | 2 (Inv.) | 3 (Inv.) |
| Base Asphalt | Wt % | 100 | 99.9 | 99.7 |
| Phosphoric Acid | Wt % | | 0.1 | 0.3 |
| Binder DSR | ° C. | 66.3 | 68.2 | 68.8 |
| RTFO DSR | ° C. | 67.8 | 71.7 | 72.3 |
| PAV DSR | ° C. | 23.0 | 24.0 | 25.1 |
| m-Value | ° C. | −14.8 | −14.1 | −14.0 |
| S-Value | ° C. | −15.8 | −16.2 | −16.4 |

As shown in Example 2, the addition of 0.1 wt % phosphoric acid only raised the ODSR (original DSR or binder DSR) Fail Temperature by 1.9° C. However, the RTFO DSR Fail Temperature was improved by 3.9° C. An increase in the phosphoric acid concentration to 0.3 wt % (Example 3) marginally improved the high-temperature properties, compared to the blend with 0.1 wt % additive phosphoric acid. There was no change in low-temperature properties with phosphoric acid addition. There was a slight increase in the PAV DSR Fail Temperature upon acid addition. The increase in PAV DSR Fail Temperature could be a concern in asphalts where PAV DSR Fail Temperature is at or near the specification maximum of 25° C.

PMA produced from the phosphoric acid-treated base stock showed improvement in high-temperature properties. The test results from the PMA blends are presented in Table III.

TABLE III

PMA formulated from Base Asphalt Treated with Phosphoric Acid.

| | Units | 1 (Cont.) | 4 (Cont.) | 5 (Inv.) | 6 (Inv.) |
|---|---|---|---|---|---|
| Base Asphalt | Wt % | 100 | 96 | 96 | 96 |
| FP502 | Wt % | | 4 | 4 | 4 |
| ZnO | Wt % | | 0.06 | 0.06 | 0.06 |
| MBT | Wt % | | 0.06 | 0.06 | 0.06 |
| Sulfur | Wt % | | 0.12 | 0.12 | 0.12 |
| Phosphoric Acid | | | | 0.1 | 0.3 |
| Binder DSR | °C. | 66.3 | 83.4 | 85.3 | 86.7 |
| RTFO DSR | °C. | 67.8 | 81.2 | 84.6 | 85.0 |
| PAV DSR | °C. | 23.0 | −18.8 | 21.1 | 20.7 |
| m-Value | °C. | −14.8 | −17.5 | −16.5 | −16.4 |
| S-Value | °C. | −15.8 | −20.4 | −20.7 | −20.2 |
| 48 hr Compatibility | °F. (°C.) | | 4.7 (2.6) | 1.4 (0.78) | 6.6 (3.7) |
| 48 hr Compatibility | °F. (°C.) | | N/A | 0.7 (0.39) | 18.3 (10.2) |
| 135° C. Viscosity | Pa * s | | 1.92 | 2.35 | 2.85 |

Addition of 0.1 wt % phosphoric acid to the PMA raised the ODSR Fail Temperature of the PMA by 1.9° C. More importantly, the MP-1-limiting RTFO DSR Fail Temperature was raised by 3.4° C., showing an improvement in the high-temperature MP1 properties. There was a slight increase in the PAV DSR Fail Temperature of the PMA, but the final PAV DSR Fail Temperature was well below the specification maximum of 28° C. The low-temperature properties were effectively unchanged. The PMA formulated from the base treated with 0.1 wt % phosphoric acid was rubber compatible with a separation of 0.7° F. (0.39° C.) after 48 hrs. The PMA formulated from the base treated with 0.3 wt % phosphoric acid was not compatible with a measured separation of 18.3° F. (10.2° C.) after 48 hrs. The MP1 properties of the 0.3 wt % acid-treated PMA were not significantly improved compared to the PMA from the 0.1 wt %-treated base.

EXAMPLES 7-14

In Examples 1-6, acid addition was shown to have beneficial effects on the high-temperature properties of neat asphalt and PMA. A second asphalt base stock, with poor high-temperature MP1 properties when modified with rubber, was treated with phosphoric or sulfuric acid, and tested for MP1 properties in Examples 7-14. The PMA was formulated from the acid-treated base stock, or the PMA was treated with acid after crosslinking.

The materials used in Examples 7-14 included the second base asphalt, FINAPRENE 502 SBS polymer (FP502), ZnO, MBT, sulfur, phosphoric acid and sulfuric acid. The experimental formulation and initial procedures are given in Table IV. Zinc oxide in the amount of 0.2 wt % was added to the base stock before MP1 grading or PMA formulation

TABLE IV

Formulations of Examples 7-14

| Ex. | Formulation and Initial Procedure |
|---|---|
| 7 | MP1 Grade second base asphalt. |
| 8 | 2.0% FP502 in 98% second base asphalt, crosslinked with 0.06 wt % MBT/12 wt % S. |
| 9 | Treatment of asphalt with 0.1 wt % sulfuric acid. |
| 10 | Treatment with 0.1 wt % sulfuric acid followed by polymer modification with 2.0 wt % FP502 in 98% second base asphalt, crosslinked with 0.06 MBT/12S. |
| 11 | Polymer modification with 2.0% FP502 in 98% second base asphalt, crosslinked with 0.06 MBT/12S; treated with 0.1 wt % sulfuric acid one hour after crosslinker addition. |
| 12 | Treatment of asphalt with 0.1 wt % phosphoric acid. |
| 13 | Treatment with 0.1 wt % phosphoric acid followed by polymer modification with 2.0% FP502 in 98% second base asphalt, crosslinked with 0.06 MBT/12S. |
| 14 | Polymer modification with 2.0% FP502 in 98% second base asphalt, crosslinked with 0.06 MBT/12S; treat with 0.1 wt % phosphoric acid one hour after crosslinker addition. |

Procedure

The following mixing procedures were used for the acid-modified asphalt and PMA blends:

The asphalt was heated to 350° F. (177° C.) with low shear mixing. The specified acid was added and the mixture stirred for 10 minutes. For blends with no additional polymer modification, heating continued at 350° F. (177° C.) for one hour. The mixture was aged for 24 hrs at 325° F. (163° C.).

For PMA blends, please note when the acid addition was made. Mixing was set to high shear and the FP502 polymer added. Mixing continued on high shear for 1 hour at 350° F. (177° C.). Mixing was reduced to low shear. The cross-linking agents were added and mixing continued on low shear at 350° F. (177° C.) for 1 hour. The PMA mixture was aged in the oven at 325° F. (163° C.) for 24 hours. The resulting cured asphalts were tested for 48-hour compatibility and were MP1 graded. The 135° C. Brookfield Viscosity values were measured. Observations were noted (e.g. gelling, film formation, lumps, smoke, etc.).

Treatment of the neat asphalt with 0.1 wt % sulfuric acid (Comparative Example 9) resulted in only modest improvement in the limiting RTFO DSR Fail Temperature and no improvement in the ODSR Fail Temperature. The PAV DSR Fail Temperature was increased outside of the specification maximum of 25° C. There was no change in the low-temperature properties. PMA produced from the sulfuric acid-treated base (Inventive Example 10) showed no effective change in the ODSR Fail Temperature, compared to the Control Blend (Comparative Example 9), but did show a 3° C. improvement in the limiting RTFO DSR Fail Temperature. The results were intermediate for the PMA in which the acid was added after crosslinking (Comparative Example 11). Test results for the blends treated with sulfuric acid are presented in Table V.

None of the PMA blends with sulfuric acid treatment were compatible after 24 hrs. However, there was improvement in the compatibility in Examples 10 and 11 compared to the control blend (Example 9, Table V). Nevertheless, it is known that this asphalt is compatible after 48 hrs with crosslinked FP502 modification.

Treatment of the neat asphalt with 0.1 wt % phosphoric acid resulted in only modest improvement in the limiting RTFO DSR Fail Temperature and no improvement in the ODSR Fail Temperature (Example 12). The PAV DSR Fail Temperature was increased outside of the specification maximum of 25° C. There was no change in the low-temperature properties. PMA produced from the phosphoric acid-treated base showed no effective change in the ODSR Fail Temperature (Example 13), compared to the control blend (Example 9, Table VI), but did show a 2.4° C. improvement in the limiting RTFO DSR Fail Temperature. The results were intermediate for the PMA in which the acid was added after crosslinking (Example 14). Test results for the blends treated with phosphoric acid are presented in Table VI.

TABLE V

Properties of PAR asphalt and PMA treated with sulfuric acid.

|  | Units | 7 (Comp.) | 8 (Comp.) | 9 (Comp.) | 10 (Inv.) | 11 (Comp.) |
|---|---|---|---|---|---|---|
| Second base asphalt | Wt % | 100 | 99.9 | 98 | 98 | 98 |
| Sulfuric Acid | Wt % |  | 0.1 |  | 0.1* | 0.1** |
| FP502 | Wt % |  |  | 2 | 2 | 2 |
| MBT | Wt % |  |  | 0.06 | 0.06 | 0.06 |
| Sulfur | Wt % |  |  | 0.12 | 0.12 | 0.12 |
| Binder DSR | ° C. | 65.9 | 66.9 | 71.4 | 71.0 | 71.5 |
| RTFO DSR | ° C. | 64.9 | 67.5 | 68.1 | 71.1 | 70.1 |
| PAV DSR | ° C. | 20.5 | 28.7 | 23.1 | 24.9 | 26.2 |
| m-Value | ° C. | −11.6 | −11.6 | −13.1 | −12.0 | −11.6 |
| S-Value | ° C. | −12.8 | −13.0 | −13.4 | −13.0 | −13.1 |
| 24-hour Compatibility | ° F. (° C.) |  |  | 5.9 (3.3) | 4.5 (2.5) | 4.6 (2.5) |
| 135° C. Viscosity | kPa |  |  | 0.783 | 0.833 | 0.855 |
| Response Factor | ° C./% |  |  | 1.60 | 3.05 | 2.60 |

*Acid added 10 minutes prior to crosslinker addition.
**Acid added 1 hr after crosslinker addition.

TABLE VI

Properties of PAR asphalt and PMA treated with phosphoric acid.

|  |  | Examples | | | | |
|---|---|---|---|---|---|---|
|  | Units | Com. 7 | Com. 12 | Com. 9 | Inv. 13 | Com. 14 |
| 2nd base asphalt | Wt % | 100 | 99.9 | 98 | 98 | 98 |
| Phosphoric Acid | Wt % |  | 0.1 |  | 0.1* | 0.1** |
| FP502 | Wt % |  |  | 2 | 2 | 2 |
| MBT | Wt % |  |  | 0.06 | 0.06 | 0.06 |
| Sulfur | Wt % |  |  | 0.12 | 0.12 | 0.12 |
| Binder DSR | ° C. | 65.9 | 66.3 | 71.4 | 71.2 | 72.1 |
| RTFO DSR | ° C. | 64.9 | 66.2 | 68.1 | 70.5 | 69.6 |
| PAV DSR | ° C. | 20.5 | 27.4 | 23.1 | 25.6 | 25.7 |
| m-Value | ° C. | −11.6 | −11.4 | −13.1 | −12.1 | −12.1 |
| S-Value | ° C. | −12.8 | −11.9 | −13.4 | −12.9 | −13.0 |
| 24-hr Compatibility | ° F. |  |  | 5.9 (3.3) | 1.2 (0.6) | 1.3 (0.7) |
| 135° C. Viscosity | kPa |  |  | 0.783 | 0.800 | 0.807 |
| Response Factor | ° C./% |  |  | 1.60 | 2.80 | 2.35 |

*Acid added 10 minutes prior to crosslinker addition.
**Acid added 1 hr after crosslinker addition.

The PMA blends with phosphoric acid treated asphalt were rubber compatible after 24 hours. The improvement in the high-temperature MP1 properties was greatest in the PMA blend in which the acid was added prior to crosslinking.

The addition of about 0.1 wt % phosphoric or sulfuric acid was thus demonstrated to increase the high-temperature limiting RTFO DSR Fail Temperature by approximately 3° C. There was no appreciable change in the low-temperature SHRP properties. Addition of the acid before crosslinking resulted in the greatest improvement in high-temperature properties. Intermediate MP1 properties were negatively affected by acid addition.

In the foregoing specification, the methods and compositions have been described with reference to specific embodiments thereof, and have been demonstrated as effective in providing methods for preparing asphalt and polymer compositions with improved high temperature properties. However, it will be evident that various modifications and changes can be made to the method without departing from the broader spirit or scope of the invention as set forth in the appended claims. Accordingly, the specification is to be regarded in an illustrative rather than a restrictive sense. For example, specific combinations or amounts of asphalt, polymer, crosslinker, acid, activator, accelerator, and other components falling within the claimed parameters, but not specifically identified or tried in a particular PMA system, are anticipated and expected to be within the scope of this innovations discussed herein. Specifically, the method and discovery of the compositions are expected to work with acids and crosslinkers other than those exemplified herein.

What is claimed is:

1. A method for preparing asphalt and polymer compositions comprising:
   heating an asphalt;
   adding an elastomeric polymer comprised of a vinyl aromatic/conjugated diene and mixing to form a mixture;
   adding polyphosphoric acid to the asphalt before or after the polymer and mixing to form another mixture;
   adding a crosslinker to the mixture after the addition of the acid and mixing to form polymer modified acid (PMA); and
   wherein the elastomeric polymer comprises from about 1 to about 20 wt. % of the PMA, and wherein the acid comprises from about 0.05 to about 2 wt. % of a total mixture of the PMA.

2. The method of claim 1, wherein low shear mixing is used to mix the asphalt after the addition of the acid and/or crosslinker.

3. The method of claim 1 wherein high shear mixing is used during at least a portion of the mixing.

4. The method of claim 1 where the proportion of inorganic acid ranges from about 0.05 to about 1 wt % based on the total mixture.

5. The method of claim 1 where the crosslinker is selected from the group consisting of sulfur, thiurams, dithiocarbamates, sulfur-containing oxazoles, thiazole derivatives, and mixtures thereof.

6. The method of claim 1 where the PMA has an improved high temperature property as compared with an identical PMA absent the polyphosphoric acid, where the property is selected from the group consisting of original dynamic shear rheometer (ODSR) and Rolling Thin Film Oven (RTFO) fail temperatures and combinations thereof.

7. The method of claim 1 further comprising the step of curing the PMA.

8. The method of claim 1 wherein the crosslinker is present in an amount ranging from about 0.01 to about 0.75 wt % of the PMA.

9. The method of claim 1 further comprising adding a metal oxide activator comprised of zinc oxide to the asphalt, wherein the activator is present in an amount ranging from about 0.0005 to about 2.0 wt % of the PMA.

10. The method of claim 9 wherein the PMA is rubber compatible after 24 hours.

11. A method for preparing asphalt and polymer compositions comprising:
    heating an asphalt;
    adding an elastomeric polymer, wherein said polymer is comprised of a vinyl aromatic/conjugated diene, and mixing to form a mixture;
    adding a crosslinker to the mixture and mixing to form another mixture; and
    adding polyphosphoric acid to the asphalt after the crosslinker and mixing to form polymer modified asphalt (PMA); and
    wherein the elastomeric polymer comprises from about 1 to about 20 wt % of the PMA, and wherein the acid comprises from about 0.05 to about 2 wt % of a total mixture of the PMA.

12. The method of claim 11 further comprising the step of curing the PMA.

13. The method of claim 11 where the crosslinker is selected from the group consisting of sulfur, mercaptobenzothiazoles and metal salts thereof, and mixtures thereof, and wherein the crosslinker is present in an amount ranging from about 0.01 to about 0.75 wt % of the PMA.

14. The method of claim 11 where the PMA has an improved high temperature property as compared with an identical PMA absent the polyphosphoric acid, where the property is selected from the group consisting of original dynamic shear rheometer (ODSR) and Rolling Thin Film Oven (RTFO) fail temperatures fail temperatures and combinations thereof.

15. The method of claim 11 wherein the crosslinker is further comprised of another crosslinker selected from the group consisting of thiurams, dithiocarbamates, sulfur-containing oxazoles, thiazole derivatives, and mixtures thereof, and wherein the crosslinker is present in an amount ranging from about 0.01 to about 0.75 wt % of the total mixture of the PMA.

16. The method of claim 11 wherein high shear mixing is used during at least of portion of the mixings.

17. The method of claim 11 further comprising adding a metal oxide activator to the asphalt comprised of zinc oxide to the asphalt, and wherein the activator is present in an amount ranging from about 0.005 to about 2.0 wt % of the total mixture of the PMA.

18. A polymer modified asphalt (PMA) composition prepared by the method of claim 17.

19. The PMA of claim 18 where the PMA has an improved high temperature property as compared with an identical PMA absent the inorganic acid, where the property is selected from the group consisting of original dynamic shear rheometer (ODSR) and Rolling Thin Film Oven (RTFO) fail temperatures and combinations thereof.

20. A road made from the PMA of claim 18 and aggregate.

21. A roof sealed with the PMA of claim 18.

22. A method of sealing a roof with PMA comprising heating the PMA of claim 18 and distributing it over at least a portion of a roof surface.

23. A method of road building comprising combining the PMA of claim 18 with aggregate to form a road paving material, and using the material to form road pavement.

24. The asphalt of claim 11 where the asphalt has an improved high temperature property as compared with an identical asphalt absent the inorganic acid, where the property is selected from the group consisting of original dynamic shear rheometer (ODSR) and Rolling Thin Film Oven (RTFO) fail temperatures and combinations thereof.

25. A method of recycling asphalt comprising physically removing asphalt from a location and reducing the size of the removed asphalt, heating the removed asphalt, adding polyphosphoric acid to the asphalt to form a mixture, adding a crosslinker to the mixture after the acid is added, wherein a Rolling Thin Film Oven (RTFO) Dynamic Shear Rheometer (DSR) Fail Temperature of the recycled asphalt with 0.1 to 0.3 wt % of the polyphosphoric acid was raised 3° C. to 4° C.

26. The method of claim 25 further comprising an elastomeric polymer to the asphalt before or after the acid and using high shear mixing during at least a portion of the time after polymer is added.

27. Asphalt made by the process of claim 25.

28. The method of claim 6 wherein 0.1 to 0.3 wt % polyphosphoric acid is added, and wherein the Rolling Thin Film Oven (RTFO) Dynamic Shear Rheometer (DSR) Fail Temperature of the polymer modified asphalt is raised 3° C. to 4° C.

29. The method of claim 6 wherein 0.1 wt % of polyphosphoric acid is added, and wherein the Original Dynamic Shear Rheometer (ODSR) Fail temperature is raised by 1.9° C.

30. The method of claim 11 wherein 0.1 to 0.3 wt % polyphosphoric acid is added, and wherein the Rolling Thin Film Oven (RTFO) Dynamic Shear Rheometer (DSR) Fail Temperature of the polymer modified asphalt is raised 3° C. to 4° C.

31. The method of claim 11 wherein 0.1 wt % of polyphosphoric acid is added, and wherein the Original Dynamic Shear Rheometer (ODSR) Fail temperature is raised by 1.9° C.

32. The method of claim 23 wherein 0.1 wt % to 0.3 wt of polyphosphoric acid is added, and wherein the Original Dynamic Shear Rheometer (ODSR) Fail temperature is raised by 2° C. to 3° C.

33. The method of claim 23 wherein 0.1 wt % to 0.3 wt of polyphosphoric acid is added, and wherein the Rolling Thin Film Oven (RTFO) Dynamic Shear Rheometer (DSR) Fail Temperature is improved by about 4° C.

34. A polymer modified asphalt (PMA) composition prepared by the method of claim 1.

35. The method of claim 1 where the crosslinker is selected from the group consisting of sulfur, mercaptobenzothiazole and metal salts thereof, and mixtures thereof.

* * * * *